Feb. 17, 1959

R. J. MASOM 2,873,682

ACCUMULATOR

Filed Sept. 8, 1953

INVENTOR
RICHARD J. MASOM
BY *James M. Nickels*
ATTORNEY

United States Patent Office 2,873,682
Patented Feb. 17, 1959

2,873,682
ACCUMULATOR

Richard J. Masom, Lyndhurst, N. J., assignor to Bendix Aviation Corporation, Teterboro, N. J., a corporation of Delaware Application September 8, 1953, Serial No. 378,898

1 Claim. (Cl. 103—52)

The present invention relates to fuel tanks or accumulators and more particularly to a fuel tank which delivers a contained liquid under the impetus of a second liquid under pressure.

In certain applications, such for example, as a combustion starter utilizing a mixture of fuel and air under pressure, it is necessary that in the accumualtor that the fuel and air be separated. Various types of accumulators having a flexible diaphragm separating the air and fuel compartments have been used, however, an accumulator of the piston type appears to be the most satisfactory for certain applications, such for example, as a combustion starter utilizing a mixture of fuel and air under pressure. Heretofore, due to the varying aromatic content of the fuel and the extreme operating temperature ranges, the use of the usual type of rubber synthetics for sealing between the piston and wall is inadequate. The aromatic content of the fuel attacks the rubber synthetics and reduces their usefulness as sealing means.

The present invention provides a sealing ring having a V-shaped configuration of a material inert to aromatic fuel, such as polytetrafluoroethylene, commonly known as Teflon. The Teflon rings are inert to the aromatic content of the fuel and also have self-lubricating properties which allow smooth movement of the piston. The sealing rings are spring biased to increase the sealing properties with increase in pressure.

It is an object of the present invention to provide an improved fuel accumulator.

Another object of the invention is to provide novel sealing means for a piston type accumulator.

Another object of the invention is to provide a piston type accumulator which will permit fuel to expand and contract with thermal changes.

The above and other objects and features of the invention will appear more fully hereinafter from a consideration of the following description taken in connection with the accompanying drawing, wherein one embodiment of the invention is illustrated by way of example.

Figure 1:
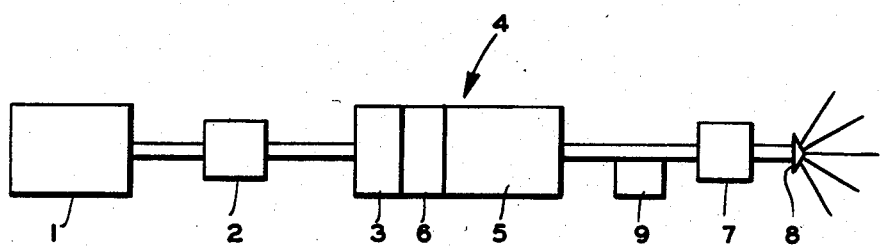
Figure 1 is a diagrammatic representation of a system embodying a fuel accumulator.

Referring now to the drawing, Figure 1 illustrates diagrammatically a system in which an air source 1 is connected through a solenoid valve 2 to air side 3 of an accumulator 4 having a fuel section 5 separated from the air section by a movable piston 6. The fuel section 5 is connected by solenoid valve 7 to a nozzle 8. The fuel section 5 is connected through a check valve 9 to a source of fuel (not shown).

In operation, when the air and fuel solenoid valves 2 and 7 are energized, air flows from the air source 1 into the air side 3 of the accumulator 4, thus actuating the piston 6 thereby closing the fuel check valve 9 and delivering the fuel to the nozzle 8.

Figure 2:
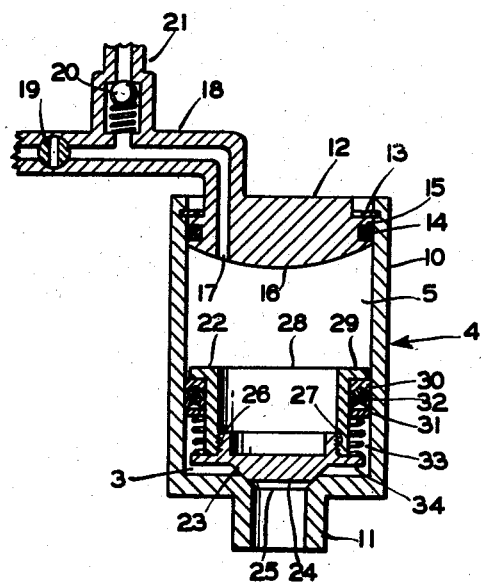
Figure 2 is a cross-section view of an accumulator illustrating one embodiment of the invention.

Referring now to Figure 2, the accumulator 4 is illustrated as having a housing 10 with a shank portion 11 at one end thereof adapted to be connected in a conventional manner to a source of compressed air (not shown). The other end of the housing 10 is fitted with a closing plate 12 sealed in position by a snap ring 13. A sealing ring 14 positioned in a groove 15 in the plate 12 prevents leakage of fuel from the accumulator. The inner side of the plate 12 is provided with a convex surface 16. A passageway 17 extends through the plate 12 and is adapted to be connected by port 18 to a combustion chamber (not shown) through a valve 19. The valve 19 may be solenoid operated from the starter control system (not shown). A check valve 20 and port 21 connect port 18 and thereby the accumulator to a fuel supply (not shown).

A piston member 22 is provided to separate the air section 3 from the fuel section 5. The piston 22 has a bottom portion 23 having the projection 24 adapted to fit into opening 25 in the projection 11 and forms a seal therewith. The member 23 has a threaded portion 26 adapted for an engagement with a threaded portion 27 of wall portion 28 of the piston 22. The portion 28 has outwardly extending flange 29.

Retaining rings 30 and 31 are adapted to hold sealing member 32 therebetween. The sealing member 32 has a V-shaped configuration and is of a material substantially inert to aromatic fuels, such as polytetrafluoroethylene. A spring 33 coacts with a flange 34 on the member 23 and the flange 29 to keep the sealing member 32 in a sealing position. While two sealing members have been illustrated, it is understood that it may be one or more.

In operation upon the air pressure being turned off, the fuel pressure biases the piston 22 in a direction to cause the member 24 to seal off the opening 25 and fuel enters through the check valve 20 to fill up the accumulator 4. The convex surface on the lid 12 prevents air from being trapped in the fuel section. The spring 33 biases the sealing members 32, so that they form a tight seal between the walls of piston 22 and the housing 10. As the pressure increases, the configuration of the sealing member is such that it spreads and tends to form a tighter seal. Also, the spring permits expansion of the fuel. Upon the air pressure being applied, the piston will move up thereby expelling the fuel from the fuel section.

Although only one embodiment of the invention has been illustrated and described, various changes in the form and relative arrangement of the parts, which will now appear to those skilled in the art, may be made without departing from the scope of the invention.

What is claimed is:

The accumulator combination comprising a housing having cylindrical inner wall, a free piston movable axially in said housing and dividing said housing into a first section for receiving an aromatic fluid fuel and a second section for receiving a fluid under pressure for actuating said piston to force said aromatic fuel from said first section, said piston including a pair of short outwardly extending circumferential flanges spaced apart axially on said piston and a cylindrical central portion, both of said flanges being spaced from the inner wall of said housing, a plurality of V-shaped sealing rings of a polytetrafluoroethylene self-lubricating material and slidably mounted on said piston between said flanges, retaining rings slidably mounted on said central portion and at opposite sides of said sealing rings, said retaining rings being in proximity to the inner wall of said housing, one of said piston flanges being positioned on said piston adjacent the first fuel section and the other of said piston flanges being positioned on said piston adjacent the second pressure section of the housing, said V-shaped sealing rings having an apexed side thereof bearing on one of said retaining rings, the other of said retaining rings having a flat side abutting the opposite open-V side of said sealing rings, a cylindrical spring between the other of said piston flanges and the other of said retaining rings at the opposite open-V side of said sealing rings, said spring biasing said retaining rings and V-shaped sealing rings toward said one piston flange adjacent the first aromatic fluid fuel section and compressing said V-shaped seal between said retaining rings so as to cause the V-shaped sealing rings to spread outwardly providing a riding surface between said free piston and said housing and a slidable seal between the first aromatic fluid fuel section and the second fluid pressure section to prevent leakage of fluid between said sections and to accommodate thermal expansion of fuel.

References Cited in the file of this patent

UNITED STATES PATENTS

| | | |
|---|---|---|
| 1,002,173 | Naegelen | Aug. 29, 1911 |
| 1,396,714 | Carmichael | Nov. 8, 1921 |
| 1,974,362 | Marsh | Sept. 18, 1934 |
| 2,196,959 | Crothers | Apr. 9, 1940 |
| 2,417,840 | Rodgers et al. | Mar. 25, 1947 |
| 2,571,538 | Christensen | Oct. 16, 1951 |
| 2,592,613 | Snyder | Apr. 15, 1952 |
| 2,600,061 | Lord | June 10, 1952 |
| 2,670,973 | Ginther et al. | Mar. 2, 1954 |
| 2,692,704 | Benz | Oct. 26, 1954 |
| 2,720,220 | Gratzmuller | Oct. 11, 1955 |
| 2,724,412 | Gratzmuller | Nov. 22, 1955 |
| 2,814,252 | Volk | Nov. 26, 1957 |